US008767345B2

(12) United States Patent
Tanaka et al.

(10) Patent No.: US 8,767,345 B2
(45) Date of Patent: Jul. 1, 2014

(54) MAGNETIC HEAD HAVING A CONTACT DETECTION SENSOR

(75) Inventors: Hideaki Tanaka, Odawara (JP); Kiyonori Shiraki, Odawara (JP); Atsushi Kato, Odawara (JP); Ichiro Oodake, Odawara (JP); Hiroshi Agari, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 90 days.

(21) Appl. No.: 13/085,417

(22) Filed: Apr. 12, 2011

(65) Prior Publication Data

US 2012/0262816 A1 Oct. 18, 2012

(51) Int. Cl.
*G11B 5/127* (2006.01)

(52) U.S. Cl.
USPC .......................................... 360/110

(58) Field of Classification Search
USPC .......................................... 360/110
See application file for complete search history.

(56) References Cited

U.S. PATENT DOCUMENTS

| 5,625,512 | A | 4/1997 | Smith |
| 5,825,181 | A | 10/1998 | Schaenzer et al. |
| 6,262,572 | B1 | 7/2001 | Franco et al. |
| 6,377,422 | B1 | 4/2002 | Boutaghou et al. |
| 7,027,263 | B2 | 4/2006 | Ottesen et al. |
| 7,589,928 | B2 | 9/2009 | Roy et al. |
| 7,770,438 | B2 | 8/2010 | Kiyono et al. |
| 7,796,356 | B1 | 9/2010 | Fowler et al. |
| 7,800,858 | B1 | 9/2010 | Bajikar et al. |
| 8,139,310 | B1 * | 3/2012 | Hogg .............................. 360/75 |
| 2002/0054462 | A1 * | 5/2002 | Sun et al. .................. 360/324.2 |
| 2002/0097513 | A1 * | 7/2002 | Ng et al. .......................... 360/31 |
| 2003/0058559 | A1 * | 3/2003 | Brand et al. .................... 360/31 |
| 2005/0013057 | A1 * | 1/2005 | Kurita et al. ............... 360/294.7 |
| 2008/0218891 | A1 * | 9/2008 | Gubbins et al. ................. 360/59 |

(Continued)

FOREIGN PATENT DOCUMENTS

JP 11195209 A 7/1999
JP 2008/077751 A 4/2008

OTHER PUBLICATIONS

Soumura, "Magnetovolume Contribution to the Temperature Variation of the Magneto-Resistivity in Fe-Ni Invar Alloys," Journal of the Physical Society of Japan, vol. 42, No. 3, Mar. 1977, pp. 826-832.

(Continued)

*Primary Examiner* — Wayne Young
*Assistant Examiner* — Adam B Dravininkas
(74) *Attorney, Agent, or Firm* — Zilka-Kotab, PC

(57) ABSTRACT

A thermally actuated head for magnetic head for magnetic data recording having a contact sensor for detecting contact between the head and a magnetic disk. The contact sensor includes a thermal sensor film and first and second leads, wherein the leads extend at least as far from the ABS as the thermal sensor film. More preferably the leads extend slightly further from the ABS than the sensor film so that contact between the magnetic disk and the contact sensor occurs at the leads rather than at the sensor film. The sensor film can be constructed of NiFe, preferably having 30-70 atomic percent Ni or more preferably 40-60 atomic percent Ni or most preferably 40-50 atomic percent Ni. The leads are preferably constructed of one or more of Ru, Rh or Ta or an alloy whose primary constituents are Ru, Rh or Ta.

23 Claims, 7 Drawing Sheets

(56) References Cited

U.S. PATENT DOCUMENTS

| | | | |
|---|---|---|---|
| 2008/0225426 A1* | 9/2008 | Roy et al. | 360/31 |
| 2008/0239581 A1* | 10/2008 | Ikai et al. | 360/272 |
| 2010/0123966 A1* | 5/2010 | Antoku et al. | 360/59 |
| 2011/0235208 A1* | 9/2011 | Yang | 360/75 |
| 2011/0249363 A1* | 10/2011 | Kanaya et al. | 360/110 |

OTHER PUBLICATIONS

Amor et al., "NiFe 45/55 and Its Application in a Strained Gauge Sensor," Proceedings of the 206th Meeting of the Electrochemical Society, (The Eight International Symposium on Magnetic, Materials, Processes, and Devices), 2004, Honolulu, Hawaii, USA, L2 Paper 1170, pp. 1-2.

Rajanna et al., "Strain Sensitivity and Temperature Behavior of Invar Alloy Films," 2000 Elsevier Science S.A., Materials Science and Engineering B77, 2000, pp. 288-292.

Robertson et al., "High Performance Write Head Using NiFe 45/55," 1997 IEEE, IEEE Transactions on Magnetics, vol. 33, No. 5, Sep. 1997, pp. 2818-2819.

\* cited by examiner

MAGNETIC HEAD HAVING A CONTACT DETECTION SENSOR

FIELD OF THE INVENTION

The present invention relates to magnetic data recording, and more particularly to a magnetic head having an improved sensor for detecting head to disk contact.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk and thus lifts the slider above the disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least a coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft underlayer of the magnetic medium to return to the return pole of the write head.

A magnetoresistive sensor such as a Giant Magnetoresistive (GMR) sensor, or a Tunnel Junction Magnetoresisive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

One parameter that is of great importance to the performance of the magnetic data recording system is the magnetic spacing. As the slider flies over the disk, the magnetic spacing between the magnetic read/write head and the magnetic write layer of the magnetic media is dominantly affected by the fly height of the head. The performance of the read and write heads increases exponentially with a decrease in magnetic spacing. However, the head should not actually contact the disk, since this can result in damage to the head and/or the disk. The fly height can be controlled to some extent by the design of the air bearing surface. To further reduce and control the fly height, thermal actuators can be incorporated into a head to decrease the fly height and thus magnetic spacing through thermal expansion of the read and write head components.

SUMMARY OF THE INVENTION

The present invention provides a head for magnetic data recording, comprising a slider having an air bearing surface. A read sensor, thermal actuator, magnetic writer and a contact sensor are formed on the slider. The contact sensor includes a sensor film having an electrical resistance that changes in response to a change in temperature, and first and second leads connected opposite ends of the sensor film. Each of the first and second leads extends from the air bearing surface a distance that is at least as great as a distance by which the sensor film extends from the air bearing surface.

By extending the leads slightly further than the sensor film, any contact between the disk and the contact sensor occurs primarily at the leads rather than at the sensor film. This prevents the sensor film from being damaged, allowing the contact sensor to have a long reliable life after many disk/head contacts.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
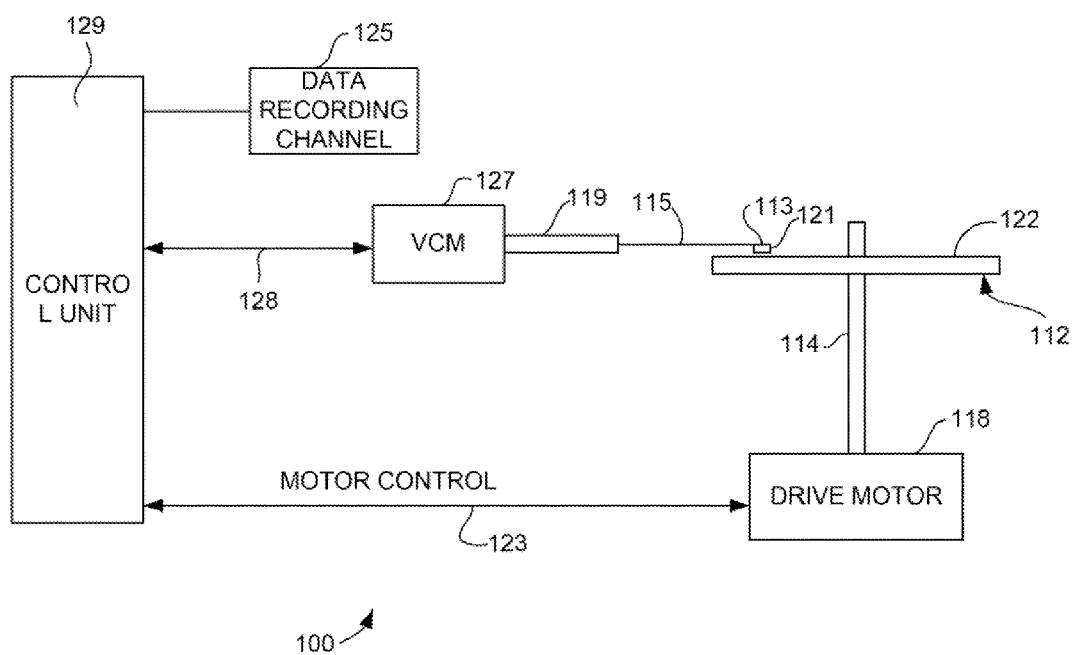
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant fly height during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Reduction of the magnetic spacing between the surface 122 of the magnetic disk 112 and the head 121 is indispensible in improving recording density of a magnetic disk drive device 100. In recent years, the technique of thermally controlling the fly height has been employed such as through the use of a thermal element that can be used to heat the elements of the head, resulting in thermal expansion of these elements. Using this technique, a system can be devised wherein a minute clearance of no more than a few nanometers can be achieved by bringing the magnetic disk 112 into contact with the magnetic head 121 and then slightly reducing the heating to slightly increase fly height.

When using such a system it is extremely important that the contact between the magnetic head 121 and disk 112 be detected with high sensitivity. Methods for detecting contact with the magnetic disk device can include; the method of ascertaining vibration of the magnetic head produced by contact in the form of fluctuation of the output of the magnetic sensor; the method of monitoring fluctuation of the position-determining signal caused by the frictional force of contact; and the method of determining fluctuation of load of the voice coil motor or spindle motor. However, none of these methods involves direct detection of contact, but rather detection of secondary fluctuation. Detection of contact with high precision is therefore difficult and the limit to which fly height can be reduced is largely controlled by the precision of detection of contact. Therefore, a contact sensor of high sensitivity, capable of detecting contact more directly is therefore desired.

Figure 2:
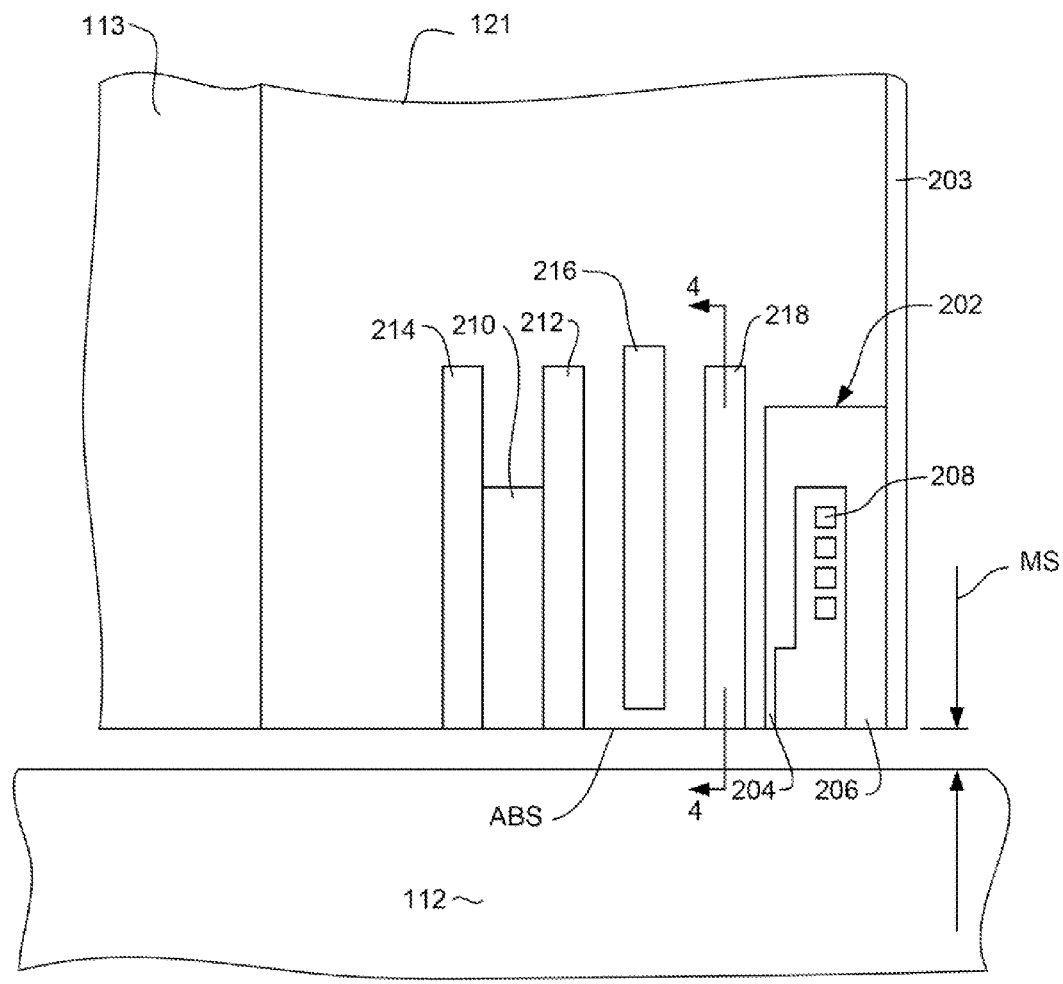
FIG. 2 is an enlarged side cross sectional view of a magnetic head incorporated onto a slider according to an embodiment of the invention.

The present invention provides durable, long lasting, high precision contact sensor 218. FIG. 2 shows an enlarged cross sectional view of the magnetic head 121 formed on the slider 113 and in relation to the magnetic media (i.e. disk) 112. The magnetic head 121 includes a magnetic write head 202 that can include a magnetic write pole 204 a magnetic return pole 206 and an electrically conductive write coil 208. A non-magnetic, electrically insulating protective coating such as alumina 203 can be formed over the top of the write head 202. The magnetic head 121 also includes a magnetic sensor 210 for reading a magnetic signal from the magnetic media 112. The read magnetic sensor 210 can be sandwiched between first and second magnetic shields 212, 214. The magnetic head 121 can also include a thermal actuator 216. The thermal actuator can be recessed from the air bearing surface (ABS) as shown in FIG. 2 or can extend to the ABS. The head 121 further includes a contact sensor 218 that functions to detect contact between the head 121 and the magnetic media 112. The contact sensor 218 will be described in greater detail herein below.

Figure 3:
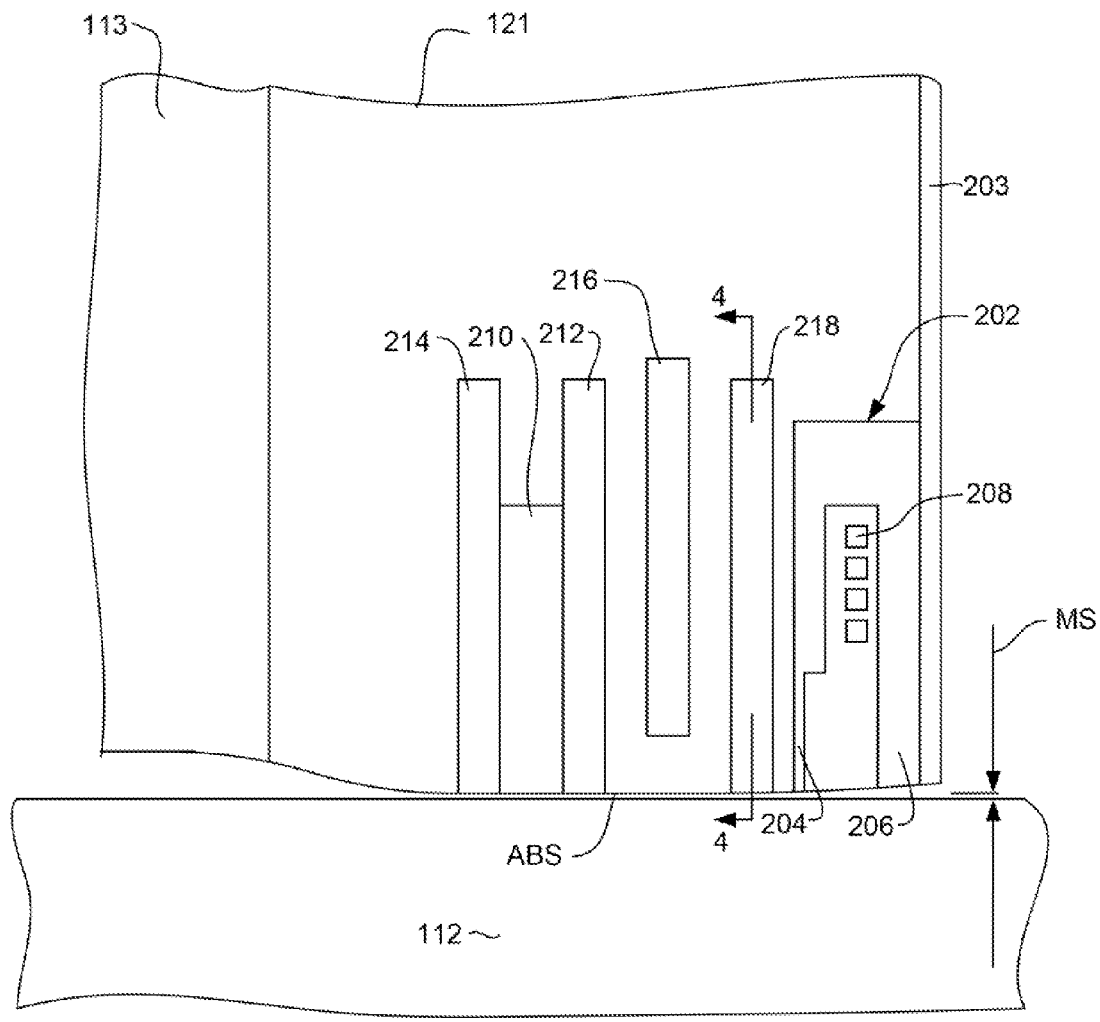
FIG. 3 is an enlarged side cross sectional view of the magnetic head of FIG. 2 with a thermal actuator activated.

FIG. 3 shows the magnetic head 121 with the thermal actuator 216 activated. When the actuator 216 is activated, such as by the application of an electrical current, it heats up. This heating, in turn, heats up the adjacent components of the magnetic head 121 causing thermal expansion of these components. This causes the ABS of the head 121 to bulge outward toward the magnetic media, thereby reducing the fly height between the surface of the head 121 and the media 112 and therefore also reducing the magnetic spacing MS between the magnetic write layer of the media 112 and the write pole 204 sensor 210.

Figure 4:
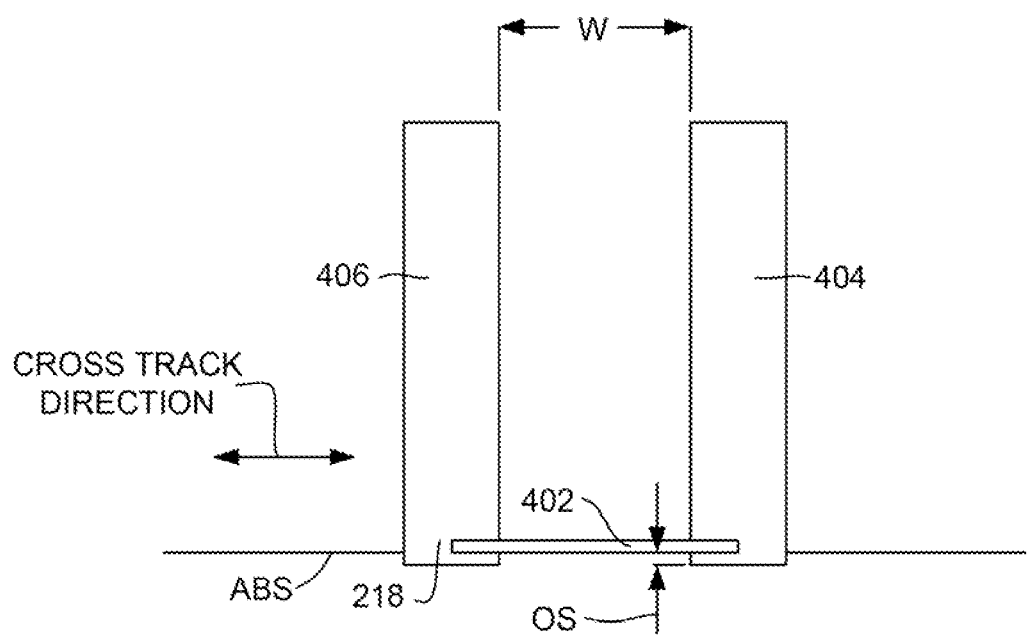
FIG. 4 is a cross sectional view, taken from line 4-4 of FIG. 2, of a contact sensor according to an embodiment of the invention.

FIG. 4 shows a cross sectional view of the contact sensor 218 as taken from the line 4-4 of FIG. 2. The sensor 218 includes a pair of leads 404, 406 each connected with a resistive contact sensor film 402 formed at the air bearing surface ABS of the head. The contact sensor film 402 is an electrical resistor, constructed of a material that whose resistance varies with temperature, in order to sense a temperature change produced by contact with or proximity to the magnetic disk 112 (FIG. 2). In order for the contact sensor film 402 to be able to sense changes of temperature produced by such contact or proximity with the magnetic disk 112 with high sensitivity, the sensor 218 should be exposed directly to the air bearing surface ABS, or it should be exposed thereto through an intervening thin protective film (not shown in FIG. 4) which may have a thickness of about 3 nm or less. According to the results of thermal analysis of the temperature rise produced by frictional heating of a contact with the disk 112, the inventors have found that the rise in temperature that occurs at a location a few hundred nm away from the contact point is less than half of what it would be at the point of contact. Consequently, in order to detect contact with high sensitivity, it is preferable that the contact sensor film 402 be either directly exposed to the air bearing surface, or be covered only by a thin intervening protective film.

The sensor film 402 should be constructed of a material having a prescribed resistivity and, as discussed above, should have a resistivity that changes with temperature. In addition, it is preferable that the film 402 be constructed of a material that can be formed by the same deposition processes used to construct the other elements of the read and write head (e.g. the read sensor 210 and write head 202 (FIG. 2)). In addition, the material used to construct the film 402 should be chemically stable and resistant to corrosion.

As a result of searching for materials that satisfy these conditions, alloy films whose chief constituent is NiFe have been found to be most suitable for use in the contact sensor film 402. Ni—Fe based alloys are widely used in magnetic heads, their formation is comparatively easy, and their temperature coefficient of resistance (TCR) is 0.2 to 0.4%/degree C. Also, such alloys have good structural properties for use in magnetic heads. In particular, a structure constructed of a NiFe alloy presents few problems when exposed to the Air Bearing Surface ABS.

The inventors studied suitable ranges of composition for the contact sensor film 402, using NiFe alloys of various different compositions, formed by sputter deposition. The evaluation parameters include: film resistivity, Temperature Coefficient of Resistance (TCR), magnetoresistive effect, and resistance to corrosion. While it is desirable that the material employed as the sensor film 402 have a high TCR, it is also desirable that the resistivity should not be too small, in order to increase the degrees of freedom in the sensor design for obtaining the prescribed resistance. Also, since the film is employed as a sensor in the magnetic head 121 (FIG. 2), it is desirable that its resistance should be unchanged by the magnetic field that is generated by the magnetic head 121 and/or magnetic disk 112. In other words it is desirable that the magnetoresistive effect (AMR) effect of the film should be small. If the AMR effect is large, signal noise tends to be generated due to magnetic field changes, such as from the magnetic disk 112. Furthermore, since it is a necessary condition in the construction according the present invention that the contact sensor film 402 should be directly exposed to the air bearing surface ABS or exposed through an intervening protection layer, the corrosion resistance of the contact sensor film 402 also needs to be high.

Figure 6:
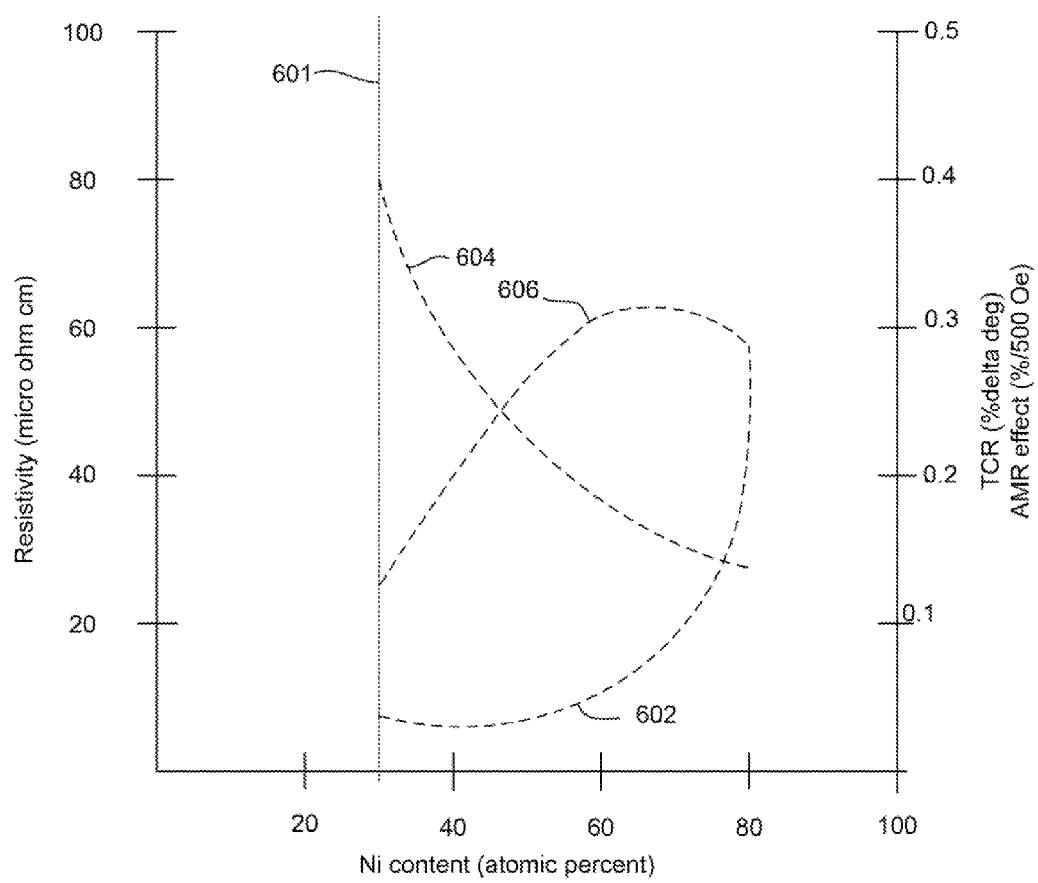
FIG. 6 is a graph showing a relationship between Fe content and resistivity, temperature coefficient of resistance and magnetic resistive effect.

FIG. 6 shows the measurement results of the electrical/magnetic characteristics of a Ni—Fe alloy. Curve 602 illustrates how the magnetoresistive effect of the Ni—Fe alloy changes with Ni content. Curve 604 shows how the resistivity of the Ni—Fe alloy changes with Ni content, and curve 606 shows how the Temperature Coefficient of Resistance (TCR) changes with Ni content. The crystalline structure of NiFe alloy changes from a BCC structure to an FCC structure when the Ni content reaches about 30 atomic percent, as indicated by dotted line 601. It was found that, in the case of a body centered cubic (BCC) structure of low Ni content, the Temperature Coefficient of Resistance (TCR) is comparatively low, and, in a separately conducted evaluation of resistance to corrosion, the resistance to corrosion was found to be severely degraded compared with the film of high Ni content. It was therefore concluded that it would be desirable to select the material of the contact sensor film 402 from material of a Face Centered Cubic (FCC) crystal structure, which is of a higher Ni content. Further, regarding the effect of composition in the FCC structure, it was found that it was undesirable for the Ni content to be too high, since this resulted in lowered resistivity and an increase in the AMR effect. Regarding resistance to corrosion, not much difference was found in the FCC structure compositions that were evaluated. From the results shown in FIG. 6 it can be seen that it is desirable that, when employing a NiFe alloy as the sensor material, the Ni content should be at least 30 atomic percent, but no more than 70 atomic percent. To achieve both high TCR and low AMR effect the Ni content is more preferably at least 40 atomic percent, but not greater than 60 atomic percent. To further minimize risk of being affected by the AFM effect, the Ni content is even more preferably at least 40 atomic percent but not more than 50 atomic percent. It should be noted that, even in cases where small quantities of other elements are added to the NiFe alloy, the electrical/magnetic properties are substantially determined by the NiFe composition, so it is evident that the Ni content according to the present invention is most effective in regard to alloys whose chief constituents are Ni and Fe.

Figure 5:
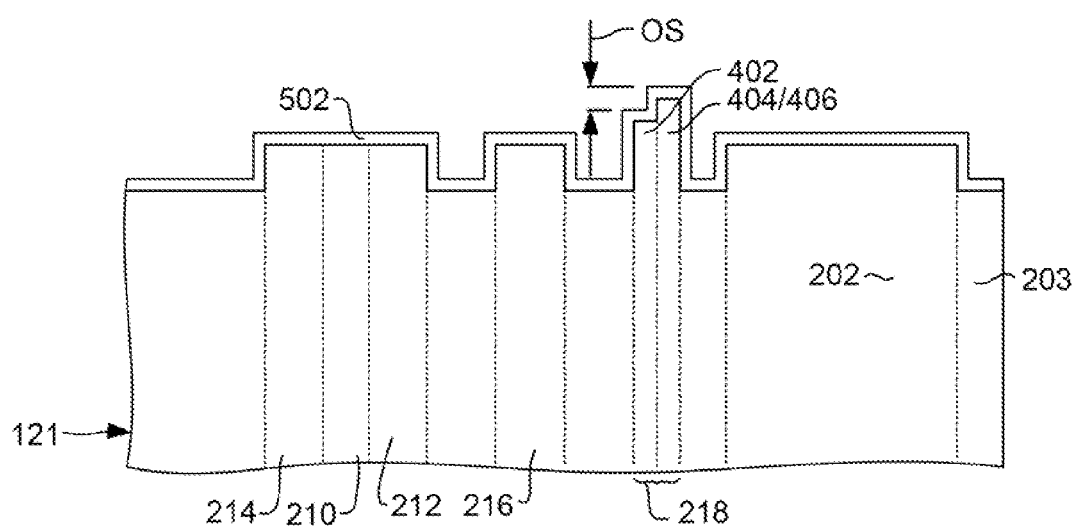
FIG. 5 is an enlarged cross sectional view of a magnetic incorporating a contact sensor, showing an profile of the components of the magnetic head.

With continued reference to FIG. 4, the material of the contact sensor leads 404, 406 must meet several criteria. Just as in the case of the contact sensor film 402, the contact sensor leads 404, 406 are preferably constructed of a material that can easily be formed in the same deposition tools used to construct the other materials of the head 121 (FIG. 2). The leads 404, 406 are also preferably constructed of a material that is chemically stable. As can be seen in FIG. 4, the contact leads 404, 406 are exposed at the ABS, although, like the film 402, they may be covered by a thin protective layer which is not shown in FIG. 4 for purposes of clarity, but which is shown in FIG. 5 as element 502. Therefore, the same physical robustness and corrosion resistance required of the sensor film 402 are also required of the leads 404, 406.

As a result of searching for materials that meet these requirements, the inventors have discovered that a material whose chief constituent is Ru, Rh or Ta, either alone or in an alloy, provides excellent properties for use in the leads 404, 406. These materials show good results when used with a magnetic head 112 and present no problems with regard to electrical resistance or corrosion. On the other hand, typical lead materials such as Cu or Au, which are commonly used as lead materials in magnetic heads, have proven unsuitable for the material of the contact sensors leads 404, 406. In the case of Cu, resistance to corrosion is insufficient, and Au is unacceptable because of its incompatibility with the cutting, grinding and lapping processes used to create the air bearing surface ABS. Abrasive grains used in the lapping processes become embedded in the Au or produce ablation of the contact sensor leads. Ru, Ru or Ta, however do not experience these problems and produce excellent results.

With this in mind, the composition of the sensor film 402, and leads 404,406 can be described in greater detail. Although these might be in principle the study of independent design, since they have different functions, has been discovered that, when the selected materials are employed as the leads 404, 406 and sensor film 402, the geometrical relative relationship of the film 402 relative to the leads 404, 406 serves an important and un-obvious role with regard to the reliability of the sensor 218. More specifically, it is preferable that the cross-sectional portion of the contact sensor leads 404, 406 extend at least as far from the ABS as the sensor film 402.

More preferably, as shown in FIG. 4, and also in FIG. 5, each of the leads 404, 406 extends from the ABS a distance that is at least as great, or greater than, the film 402. The difference between the amount by which the leads 404, 406 extend and the amount by which the sensor 218 extends defines an offset distance labeled "OS" in FIGS. 4 and 5. FIG. 5 shows a cross sectional view of a plane that is parallel with the direction of the data track "DT". In FIG. 5, head is turned so that the ABS is facing upward. Also, FIG. 5 shows the inclusion of a thin protective layer 502 that covers the air bearing surface (ABS) of the head. While this protective coating 502 can prevent corrosion in the elements of the head 121, it can easily be worn off (especially at the location of the sensor 218) when components of the head 121 come into contact with the magnetic media 112 (FIG. 2). It is therefore desirable that the materials of the sensor 218 have good corrosion and wear resistance as discussed above.

In FIG. 5, one of the leads 404, 406 of the contact sensor structure 218 is shown. The other lead would be buried into the plane of the Figure. As can be seen, the sensor film 402 may extend slightly further out of the ABS than the other components 202, 216, 210, 212, 214. In addition, the leads 404/406 extend at least as far as, and preferably further than, the sensor film 402. The difference between the extension of the leads 404/406 and the extension of the film 402 defines the offset (OS) as discussed above.

By making the contact sensor leads 404/406 project slightly further from the ABS than the sensor film 402, the end portion of the leads 404, 406 are the portion that chiefly affects contact when contact is detected. Since the heat generated from such contact occurs primarily first at the leads 404, 406, the temperature elevation of the contact sensor film is slightly smaller than would be the case if the sensor film 402 was the portion to primarily make contact. However, since the leads 404, 406 are in direct contact with the sensor film 402 this reduction in temperature elevation is very small. On the other hand, if the sensor leads 404, 406 were not to project further than the sensor film 402, so that the sensor film 402 primarily makes contact with the media, an unacceptable amount of wear and/or ablation can occur on the surface of the contact sensor film 402 by the repeated contact with the media. This wear or ablation is undesirable, because, if the height of the contact sensor film 402 is changed by the wear of the contact sensor film, a change in the sensor resistance is produced. Also, if ablation occurs, there is a risk of short-circuiting with other elements such as poles or shields in the head. Although this risk could be alleviated by forming the sensor film 402 flush with the air bearing surface, this risk cannot be entirely eliminated.

Also, although the material of the contact sensor film 402 is selected to take into account, as much as possible the effect of corrosion resistance, as described above, if the relative corrosion resistance compared with the material of the contact sensor leads 404, 406 is low and the protective film on the contact sensor film 402 is worn, a problem arises with regard to a reduction in lowered corrosion resistance. By making the leads 404, 406 extend slightly from the sensor film 402, this change in resistance resulting from deterioration of the contact sensor film 402 can be largely avoided. Stable and long lasting contact detection can thereby be achieved.

In order to achieve these ends of minimizing wear and ablation of the sensor layer 402 and also maximizing the efficiency of the sensor 218 in detecting contact with the media, the offset OS between the protrusion of the leads 204, 206 and film 202 is preferably between 0 and 5 nm and is more preferably between 0 and 2 nm.

Testing has confirmed that when in a head 121 having a contact sensor 218 constructed with an offset of 0.5 nm, even after 100,000 head/disk contacts, no significant change in the resistance of the contact sensor was found, and no change at all was found in the contact detection signal. By way of contrast, in a case where the sensor leads 404, 406 were recessed by about 2 nm, after the head contacted the disk 100,000 times, an increase in the resistance on the order of a few ohms was found in three of ten samples, and in the case of one of these 10 samples, the noise level of the contact detection signal was severely increased. When this head was inspected it was found that wear of the contact sensor film and/or local cracking had occurred, and it was concluded that this was caused by changes in properties of the sensor film. From these results, it appears that, by making the contact sensor leads 404, 406 project slightly from the sensor film 402, degradation of the contact sensor film 402 can be effectively suppressed and stable contact detection over a long period of time can be achieved.

It should be pointed out that the relative protrusion of the various elements of the head 121, such as the writer 202 read sensor 210 heater 216, etc. are determined by design consideration of the head 121. However, in order for the contact sensor 218 to be able to detect head/disk contact with high sensitivity, it is desirable that the reader and 210 and writer 202 not project much (or at all) beyond the contact sensor 218. More preferably, the contact sensor 218 extends beyond the reader 210 and writer 202.

This can be achieved by use of a dry etching process. As those skilled in the art will appreciate, the head 121 is constructed on a wafer along with thousands of other heads. The wafer is then sliced into rows of sliders and these rows are then lapped to define the air bearing surface. In order to form the ABS with the desired relative protrusions of elements 202, 218, 216, 212, 210, 214, a dry etching process can be performed. This can be a quick dry etching process, performed in a manner to selectively etch certain portions at a faster rate than others. By selectively etching the ABS in this manner, the sensor film material 402 to can be slightly recessed relative to the lead 404/406, resulting in a notch that defines an offset (OS). In addition, since many of the other structures such as layers of the writer 202, heater 216, shields 212, 214 and read sensor 210 are constructed of NiFe like the sensor film 402 or of similar materials, they will also be etched at a faster rate than the leads 404/406. Control of the amount of the offset OS can be achieved by selection of the material used for the sensor film 402 and leads 404/406 along with control of the etching conditions such as etching angle, gas composition and ion acceleration voltage. With the contact sensor film 402 and contact sensor leads 404, 406 employed as described above, a step of 0 nm to 2 nm can be formed with excellent controllability. After this etching process has been performed for the desired offset OS, a thin protective layer 502 can be deposited. This protective layer can be a non-magnetic, dielectric, physically robust material such as diamond like carbon (DLC) and can be deposited to a thickness of about 2 nm.

Therefore, an improved contact sensor 218 can be formed by forming the sensor film 402 of an alloy material whose chief constituents are Ni and Fe. In this way, a contact sensor can be formed that has a large TCR, a high contact detection sensitivity, is subject to little generation of noise due to magnetic field fluctuation, and which has excellent reliability. The sensor film 402 preferably has a Ni content of 30 to 70 atomic percent. More preferably the sensor film 402 has a Ni content of 40 to 60 atomic percent. Even more preferably, the sensor film 402 has a Ni content of 40 to 50 atomic percent.

With regard to the sensor leads 404, 406, these are preferably constructed of a material whose chief constituent is any of Ru, Rh or Ta, these being used either alone or in the form of an alloy, thereby ensuring good corrosion resistance and resistance to manufacturing processes.

In addition, the contact sensor 218 exhibits excellent reliability even when minute wear takes place as a result of head/disk contact by making the contact sensor leads 404, 406 extend from the ABS a distance that is at least the same as or greater than that of the contact sensor film 402.

In a more specific description of an embodiment of the invention, the sensor film 218 can have an active width (W) that is the distance between the inner edges of the leads 404, 406. This distance W is the length of thermoresistive material that can provide a resistive response to temperature rise. In a specific embodiment of the invention, this width W can be about 1 micrometer, and the resistance of the sensor film 218 across the leads 404, 406 is about 100 ohms. The film 218 can have a thickness, shown as thickness (T) in FIG. 5, of about 30 nm.

With reference again to FIG. 6, the graph shows a plot of the resistivity of the contact sensor film 402, the Temperature Coefficient of Resistance (TCR) and the AMR effect produced by application of an external magnetic field with respect to the Ni content of the sensor film. As already discussed, in the case of a Body-Centered Cubic (BCC) structure of low Ni content, the TCR is also relatively low and, in a separately conducted evaluation of resistance to corrosion, it was found that the resistance to corrosion is severely degraded compared with a form of higher Ni content. Next, when the effect of composition in a FCC structure was investigated, it was found that, if the Ni content is too high, the resistivity is lowered and an increased AMR effect is produced, which is undesirable. Regarding resistance to corrosion, not much difference was found among the FCC-structure compositions evaluated. From the above results, it was concluded that, when NiFe alloy is employed as the sensor material, preferably the Ni content is at least 30 atomic percent, but no more than 70 atomic percent, as discussed above.

Figure 7:
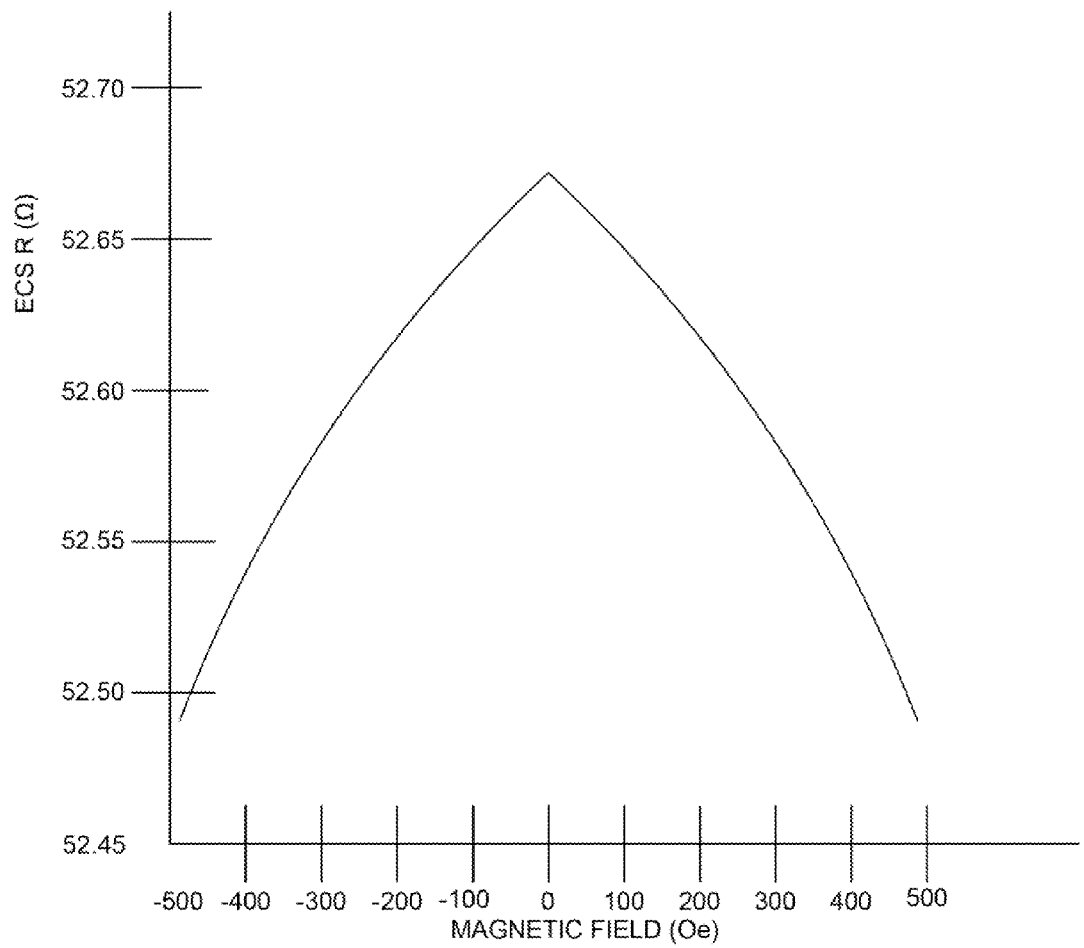
FIG. 7 is a graph showing AMR effect on a sensor film with respect to applied magnetic field.

It should be noted that, for the evaluation of the AMR effect, measurement was conducted of the change in resistance of the contact sensor 218 on the application of an external magnetic field. As an example, FIG. 7 shows the case where a contact sensor film 402 of 80 atomic percent Ni was employed. The resistance was changed by application of a magnetic field, and the amount of this change was 0.2 to 0.3%/500 Oe. When the head was levitated over a magnetic disk on which a magnetic pattern had been written, it was found that considerable signal noise was generated. It was confirmed that this noise corresponded to the magnetic pattern on the magnetic disk. Thus it was confirmed that magnetic noise is generated due to the large AMR effect of the contact sensor film 402. From the above results, it was found that it is necessary that a material of small AMR effect should be employed as the material of the contact sensor film 402. Although the AMR effect is somewhat increased, in the case of a contact sensor film of 70 atomic percent Ni (compared with the lower Ni content film described above with reference to FIG. 6) in a test conducted with a head 121 flying over a disk 112 (FIG. 1), no marked magnetic noise was detected. Therefore, from the point of view of the AMR effect, the upper limit with regard to Ni content was determined to be 70 atomic percent. However, from the point of view of achieving both high TCR and low AMR, more preferably the Ni content is at least 40 atomic percent, but no more than 60 atomic percent, further preferably no more than 50 atomic percent.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A head for magnetic data recording, comprising
  a slider having an air bearing surface;
  a read sensor formed on the slider;
  a thermal actuator;
  a magnetic writer formed on the slider; and
  a contact sensor formed on the air bearing surface of the slider, the contact sensor including a sensor film having an electrical resistance that changes in response to a change in temperature, and first and second leads connected with opposite ends of the sensor film, wherein each of the first and second leads protrudes from the air bearing surface in a direction perpendicular to the air bearing surface a distance that is at least as great as a distance by which the sensor film protrudes from the air bearing surface.

2. The head as in claim 1 wherein the first and second leads protrudes further from the air bearing surface than the sensor film.

3. The head as in claim 1 wherein the first and second leads protrude 0 to 5 nm further from the air bearing surface than the sensor film.

4. The head as in claim 1 wherein the first and second leads protrude about 0.5 nm further from the ABS than the sensor film.

5. The head as in claim 1 wherein the sensor film comprises Ni—Fe.

6. The head as in claim 1 wherein the sensor film comprises Ni—Fe having 30-70 atomic percent Ni.

7. The head as in claim 1 wherein the sensor film comprises Ni—Fe having 40-60 atomic percent Ni.

8. The head as in claim 1 wherein the sensor film comprises Ni—Fe having 40-50 atomic percent Ni.

9. The head as in claim 1 wherein first and second leads each comprise one or more of Ru, Rh or Ta.

10. The head as in claim 1 wherein the first and second leads each comprise an alloy whose primary constituent is one or more of Ru, Rh or Ta.

11. The head as in claim 1 wherein the first and second leads are separated from one another by a distance of about 1 micrometer.

12. The head as in claim 1 wherein the sensor film has a thickness of about 30 nm.

13. The head as in claim 1 wherein the nominal resistance of the sensor film across the first and second leads is about 100 ohms.

14. A magnetic data recording system, comprising:
  a housing;
  a magnetic disk mounted within the housing;
  a slider formed with an air bearing surface;
  an actuator connected with the slider to move the slider adjacent to a surface of the magnetic disk
  a read sensor formed on the slider;
  a thermal actuator formed on the slider;
  a magnetic writer formed on the slider; and
  a contact sensor formed on the slider, the contact sensor including a sensor film having an electrical resistance that changes in response to a change in temperature, and first and second leads connected with opposite ends of the sensor film, wherein each of the first and second leads extends from the air bearing surface in a direction perpendicular to the air bearing surface a distance that is at least as great as a distance by which the sensor film extends from the air bearing surface.

15. The magnetic data recording system as in claim 14 wherein the first and second leads extend further from the air bearing surface than the sensor film.

16. The magnetic data recording system as in claim 14 wherein the first and second leads extend 0 to 5 nm further from the air bearing surface than the sensor film.

17. The magnetic data recording system as in claim 14 wherein the first and second leads extend about 0.5 nm further from the ABS than the sensor film.

18. The magnetic data recording system as in claim 14 wherein the sensor film comprises Ni—Fe.

19. The magnetic data recording system as in claim 14 wherein the sensor film comprises Ni—Fe having 30-70 atomic percent Ni.

20. The magnetic data recording system as in claim 14 wherein the sensor film comprises Ni—Fe having 40-60 atomic percent Ni.

21. The magnetic data recording system as in claim 14 wherein the sensor film comprises Ni—Fe having 40-50 atomic percent Ni.

22. The magnetic data recording system as in claim 14 wherein first and second leads each comprise one or more of Ru, Rh or Ta.

23. The magnetic data recording system as in claim 14 wherein the first and second leads each comprise an alloy whose primary constituent is one or more of Ru, Rh or Ta.

* * * * *